US008552768B2

(12) United States Patent
Lee et al.

(10) Patent No.: US 8,552,768 B2
(45) Date of Patent: Oct. 8, 2013

(54) TRANSISTOR SWITCH CONTROL CIRCUIT

(75) Inventors: Li-Min Lee, New Taipei (TW);
Chung-Che Yu, New Taipei (TW);
Shian-Sung Shiu, New Taipei (TW);
Si-Min Wu, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 115 days.

(21) Appl. No.: 13/244,636

(22) Filed: Sep. 25, 2011

(65) Prior Publication Data

US 2012/0319754 A1 Dec. 20, 2012

(30) Foreign Application Priority Data

Jun. 20, 2011 (CN) .......................... 2011 1 0165794

(51) Int. Cl.
*H03B 1/00* (2006.01)
*H03K 3/00* (2006.01)

(52) U.S. Cl.
USPC ............................. 327/108; 327/109; 327/112

(58) Field of Classification Search
USPC .......................................... 327/108, 109, 112
See application file for complete search history.

(56) References Cited

U.S. PATENT DOCUMENTS

| 5,349,243 | A | * | 9/1994 | McClure ........................ 327/108 |
| 6,538,479 | B2 | * | 3/2003 | Bellomo et al. ............... 327/108 |
| 7,236,020 | B1 | * | 6/2007 | Virgil ............................ 327/108 |
| 2012/0038391 | A1 | * | 2/2012 | Lee et al. ....................... 327/109 |

* cited by examiner

*Primary Examiner* — John Poos
(74) *Attorney, Agent, or Firm* — Jianq Chyun IP Office

(57) ABSTRACT

A synchronous driving circuit in the arts may cause a short through pheromone when a duty cycle of a duty cycle control signal is too short. The present invention sets a delay time with a suitable period when the duty cycle of the duty cycle control signal is too short to avoid the short through phenomenon.

12 Claims, 5 Drawing Sheets

TRANSISTOR SWITCH CONTROL CIRCUIT

CROSS-REFERENCE TO RELATED APPLICATION

This application claims the priority benefit of China application serial no. 201110165794.3, filed on Jun. 20, 2011. The entirety of the above-mentioned patent application is hereby incorporated by reference herein and made a part of this specification.

BACKGROUND OF THE INVENTION

1. Field of the Invention

The invention relates to a transistor switch control circuit. Particularly, the invention relates to a transistor switch control circuit capable of preventing a short through phenomenon.

2. Description of Related Art

In a synchronous driving circuit, a problem most in need of attention is that a time for conducting a high-side transistor is overlapped to a time for conducting a low-side transistor to cause a short through phenomenon. In order to avoid the above problem, a dead time is set between two signals of controlling the high-side transistor and the low-side transistor. However, due to different characteristics of the transistors, the dead time required to be set is also different. If the dead time is set to a longer time, most of the transistors are matched, though a whole efficiency is decreased. On the other hand, if the dead time is set to a shorter time, some transistors may have the short through problem. In order to achieve a self-adjust ability of the synchronous driving circuit in collaboration with the transistors, a commonly used method is to detect a driving signal to confirm whether the other transistor is indeed turned off before the driving circuit turns on the corresponding transistor, so as to avoid the short through phenomenon.

Referring to FIG. 1, FIG. 1 is a circuit schematic diagram of a conventional synchronous driving circuit. The synchronous driving circuit, including RS flip-flops 10 and 20, and inverters 5, 15 and 25, is used to drive a buck converter according to a duty cycle control signal Spwm. The buck converter includes a high-side transistor Q1, a low-side transistor Q2, an inductor L and a capacitor C, and is used for converting an input voltage Vin into an output voltage Vout. The duty cycle control signal Spwm is respectively inputted to an S terminal of the RS flip-flop 10 and, through the inverter 5, an S terminal of the RS flip-flop 20. The RS flip-flops 10 and 20 respectively generate a high-side control signal HDRV and a low-side control signal LDRV through the inverters 15 and 25 to turn on the corresponding high-side transistor Q1 and the low-side transistor Q2. FIG. 2 is a circuit schematic diagram of a conventional RS flip flop, which is formed by two NAND gates. Therefore, when the R terminal of the RS flip-flop 10 or 20 receives a high logic level signal, the Q terminals thereof maintain their original outputs. Referring to FIG. 1, the R terminal of the RS flip-flop 10 receives the low-side control signal LDRV, and the R terminal of the RS flip-flop 20 receives the high-side control signal HDRV. Therefore, only after the signal received by the R terminal of the RS flip-flop 10 or 20 is transited from the high logic level to the low logic level, the output logic level of the Q terminal is changed according to the duty cycle control signal Spwm. In other words, only when the high-side transistor Q1 is turned off (the high-side control signal HDRV is at the low logic level), the RS flip-flop 20 may turn on the low-side transistor Q2, or only when the low-side transistor Q2 is turned off (the low-side control signal LDRV is at the low logic level), the RS flip-flop 10 may turn on the high-side transistor Q1.

However, the above situations are ideal situations without considering delay of each of the circuit modules. In an application environment that the high-side transistor Q1 and the low-side transistor Q2 are all N-type metal-oxide-semiconductor field-effect transistors, in order to successfully turn on the high-side transistor Q1, a bootstrap circuit is additionally added. Referring to FIG. 3, FIG. 3 is a circuit schematic diagram of another conventional synchronous driving circuit. Compared to the buck converter of FIG. 1, a bootstrap circuit 70 is added to provide a suitable driving level to the inverter 15 according to a potential of a connecting point between the high-side transistor Q1 and the low-side transistor Q2 and the input voltage Vin, so that the high-side control signal HDRV generated by the inverter 15 can indeed turn on the high-side transistor Q1. To ensure that logical operations among the RS flip-flops 10 and 20 and the inverter 15, level shifters (or level detectors) 45 and 50 are respectively added between the RS flip-flop 10 and the inverter 15 and between the RS flip-flop 20 and the inverter 15. The level shifters and the level detectors have a larger time delay compared to other circuits, and such time delay may cause misjudgement on the duty cycle control signal Spwm having a short duty cycle.

Referring to FIG. 4, FIG. 4 is a signal waveform diagram of the synchronous driving circuit of FIG. 3. Compared to the time delay of the level shifter, the time delays of the RS flip-flop and the inverter are relatively small, so that the time delays of the RS flip-flops and the inverters can be neglected. A delay time dt1 exists between the duty cycle control signal Spwm and an output signal S45 of the level shifter 45, and a delay time dt2 exists between the output signal S45 of the level shifter 45 and the output signal S50 of the level shifter 50. Therefore, referring to a left part of FIG. 4 and referring to FIG. 3, when the duty cycle control signal Spwm is transited to the high level, the inverter 5 outputs an output signal S5 of the low level, and triggers the RS flip-flop 20 to output an output signal S20 of the high level through the Q terminal. The inverter 25 inverts the output signal S20 and outputs the low-side control signal LDRV of the low level to turn off the low-side transistor Q2. After the delay time dt1, the output signal S45 of the level shifter 45 is transited to the low level, and the inverter 15 inverts the output signal S45 and outputs the high-side control signal HDRV of the high level to turn on the low-side transistor Q1. Then, after the delay time dt2, the output signal S50 of the level shifter 50 is transited to the high level. When the duty cycle control signal Spwm is transited to the low level, the inverter 5 inverts to output the output signal S5 of the high level. Meanwhile, the RS flip-flop 10 is triggered to generate a high level signal at the Q terminal. After the delay time dt1, the output signal S45 of the level shifter 45 is transited to the high level, and the inverter 15 inverts the output signal S45 and outputs the high-side control signal HDRV of the low level to turn off the low-side transistor Q1. The RS flip-flop 20 is triggered to output the output signal S20 of the low level through the Q terminal. Then, after the delay time dt2, the output signal S50 is transited to the low level to trigger the RS flip-flop 20 to output the output signal S20 of the low level through the Q terminal. The inverter 25 inverts the output signal S20 to output the low-side control signal LDRV of the high level, so as to turn on the low-side transistor Q2.

However, referring to a right part of FIG. 4 and referring to FIG. 3, when the duty cycle control signal Spwm has a short duty cycle, the duty cycle is transited from the low level to the high level and is again transited to the low level, due to the time delays of the level shifters 45 and 50, the output signal S50 is still maintained to the low level. Now, the inverter 5 outputs the high level signal, so that the RS flip-flop 20 outputs the low level signal and the inverter 25 outputs the low-side control signal LDRV of the high level to turn on the low-side transistor Q2. Then, the output signal S45 is transited to the low level, and the inverter 15 inverts the output signal S45 of the low level to output the high-side control signal HDRV of the high level to turn on the high-side transistor Q1. Therefore, the high-side transistor Q1 and the low-side transistor Q2 are simultaneously turned on for a time length st (i.e. a time length of the short duty cycle of the duty cycle control signal Spwm), which may cause the short through phenomenon.

SUMMARY OF THE INVENTION

As a synchronous driving circuit in the related art may cause a short through phenomenon when a duty cycle of a duty cycle control signal is too short. The present invention sets a delay time with a suitable period when the duty cycle of the duty cycle control signal is too short to avoid the short through phenomenon.

The invention provides a transistor switch control circuit for controlling a high-side transistor and a low-side transistor connected in series. The transistor switch control circuit includes a high-side driving circuit and a low-side driving circuit. The high-side driving circuit generates a high-side control signal according to a duty cycle control signal to turn on the high-side transistor and generate a high-side conducting signal. The low-side driving circuit generates a low-side control signal according to the duty cycle control signal and the high-side conducting signal to turn on the low-side transistor. The low-side driving circuit includes a delay circuit and a short through preventing circuit. The delay circuit generates a delay signal according to the duty cycle control signal, where a pulse width of the delay signal is greater than a pulse width of the duty cycle control signal for more than a predetermined time period. The short through preventing circuit generates the low-side control signal according to the delay signal and the high-side conducting signal, so that the low-side transistor is turned on after the high-side transistor is turned off, and is turned off before the high-side transistor is turned on.

The invention provides a transistor switch control circuit for controlling a high-side transistor and a low-side transistor connected in series. The transistor switch control circuit includes a high-side driving circuit and a low-side driving circuit. The high-side driving circuit generates a high-side control signal according to a duty cycle control signal to turn on the high-side transistor and generate a high-side conducting signal. The low-side driving circuit generates a low-side control signal according to the duty cycle control signal and the high-side conducting signal to turn on the low-side transistor. The low-side driving circuit includes a delay circuit and a short through preventing circuit. The delay circuit generates a delay signal, where a start time point of the delay signal is determined according to a start time point of the duty cycle control signal, and an end time point of the delay signal is determined according to a logic level of the duty cycle control signal after receiving the high-side conducting signal. The short through preventing circuit generates the low-side control signal according to the delay signal and the high-side conducting signal, so that the low-side transistor is turned on after the high-side transistor is turned off, and is turned off before the high-side transistor is turned on.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
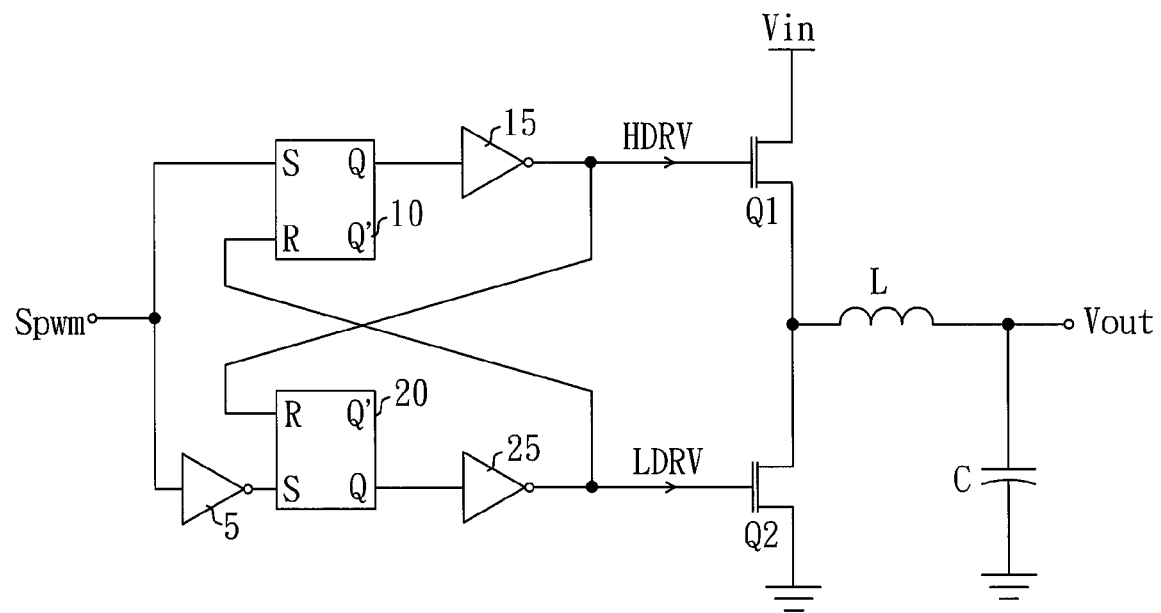
FIG. 1 is a circuit schematic diagram of a conventional synchronous driving circuit.
Figure 2:
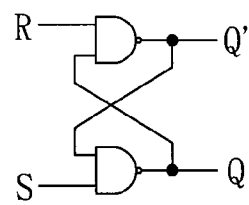
FIG. 2 is a circuit schematic diagram of a conventional RS flip flop.
Figure 3:
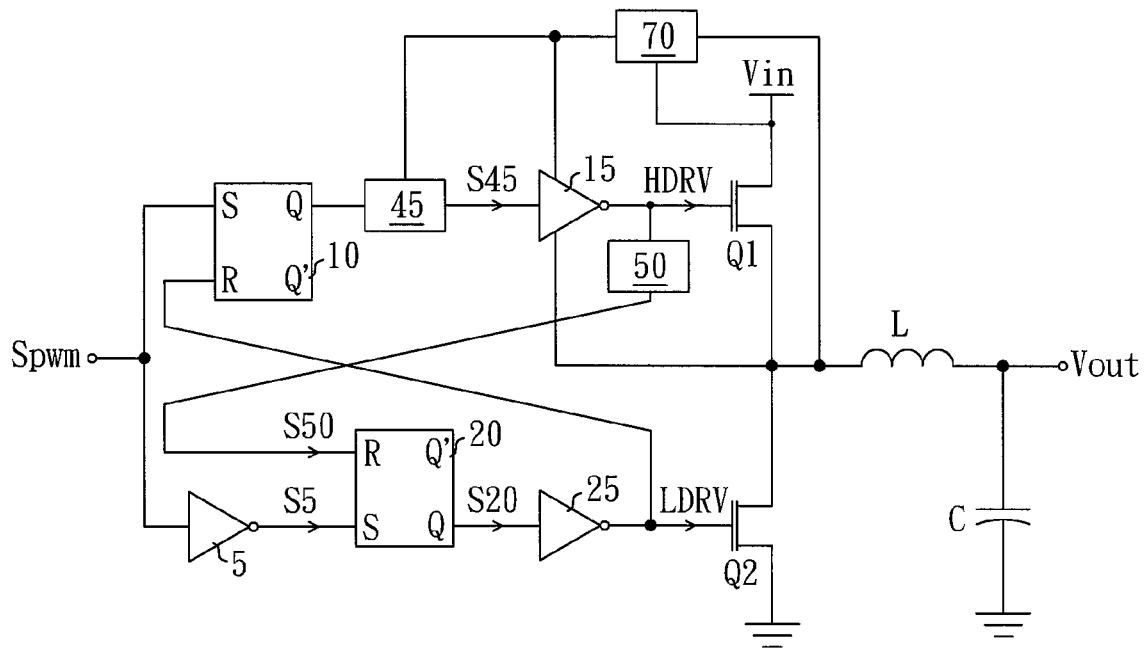
FIG. 3 is a circuit schematic diagram of another conventional synchronous driving circuit.
Figure 4:
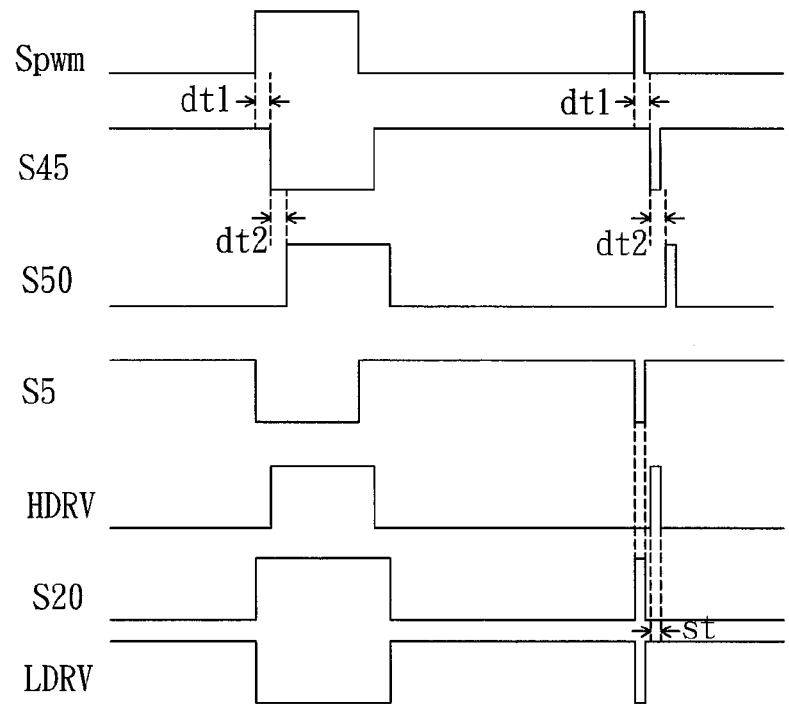
FIG. 4 is a signal waveform diagram of the synchronous driving circuit of FIG. 3.
Figure 5:
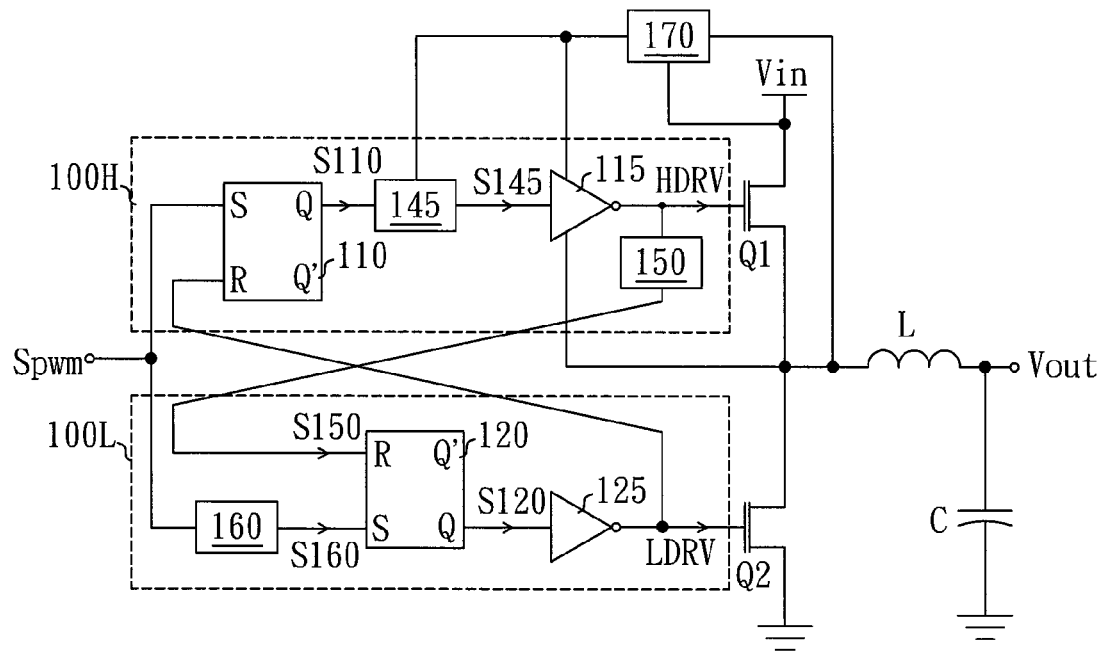
FIG. 5 is a circuit schematic diagram of a transistor switch control circuit according to a first exemplary embodiment of the invention.

FIG. 5 is a circuit schematic diagram of a transistor switch control circuit according to a first exemplary embodiment of the invention. Referring to FIG. 5, the transistor switch control circuit receives a duty cycle control signal Spwm to generate a high-side control signal HDRV and a low-side control signal LDRV to respectively control states of a high-side transistor Q1 and a low-side transistor Q2 connected in series. In the present embodiment, one terminal of the high-side transistor Q1 is coupled to a high common potential (i.e. an input voltage Vin), and one terminal of the low-side transistor Q2 is coupled to a low common potential (i.e. ground). The high-side transistor Q1, low-side transistor Q2, an inductor L and a capacitor C commonly form a buck converter. The transistor switch control circuit includes a high-side driving circuit 100H and a low-side driving circuit 100L. The high-side driving circuit 100H includes an RS flip-flop 110, level shifters 145 and 150 and an inverter 115. The high-side driving circuit 100H generates the high-side control signal HDRV according to the duty cycle control signal Spwm to turn on the high-side transistor Q1. The low-side driving circuit 100L includes a delay circuit 160 and a short through preventing circuit. The short through preventing circuit includes an RS flip-flop 120 and an inverter 125. The low-side driving circuit 100L generates the low-side control signal LDRV to turn on the low-side transistor Q2 according to the duty cycle control signal Spwm and a high-side conducting signal S150 generated by the high-side driving circuit 100H.

An S terminal of the RS flip-flop 110 receives the duty cycle control signal Spwm, and the R terminal thereof receives a low-side conducting signal (which is the low-side control signal LDRV in the present embodiment), so as to make the RS flip-flop 110 generate an output signal S110 at a Q terminal thereof. The level shifter 145 is coupled to the Q terminal of the RS flip-flop 110, a bootstrap circuit 170 and an inverter 115, and adjusts a level of the output signal S110 according to a level provided by the bootstrap circuit 170, so as to output an output signal S145 to an input terminal of the inverter 115. The inverter 115 is coupled to the bootstrap circuit 170, and performs a logic operation according to the level provided by the bootstrap circuit 170, so as to invert the output signal S145 into the high-side control signal HDRV to turn on/off the high-side transistor Q1. The level shifter 150 is coupled to an output terminal of the inverter 115, and adjusts a level of the high-side control signal HDRV to generate the high-side conducting signal S150, so as to notify the low-side driving circuit 100L whether the high-side transistor Q1 is turned on or not. A main function of the level shifter 150 is to shift the level of the high-side control signal HDRV into a level range where the low-side driving circuit 100L can perform logic processing.

The delay circuit 160 receives the duty cycle control signal Spwm to generate a delay signal S160 accordingly, where an end time point of the delay signal S160 is delayed by a time period from an end time point of the duty cycle control signal Spwm, and such time period is greater than a predetermined time period, where the predetermined time period is preferably equal to or greater than a delay time dt1 of the level shifter 145. An S terminal of the RS flip-flop 120 receives the delay signal S160, an R terminal thereof receives the high-side conducting signal S150 of the level shifter 150, so as to make the RS flip-flop 120 generate an output signal S120 at Q terminal thereof and output to an input terminal of the inverter 125. The inverter 125 inverts the output signal S120 into the low-side control signal LDRV to turn on/off the low-side transistor Q2. It should be noticed that in the invention, an end time point of a signal refers to an end time point of a circuit operation corresponding to the signal, which is not necessarily a time point that the signal is transited from a high logic level to a low logic level, which can also be transited from the low logic level to the high logic level. That is, the end time point of the signal is determined according to an actual design requirement. For example, the duty cycle control signal Spwm represents a turn-on state of the high-side transistors Q1, the end time point of the duty cycle control signal Spwm is a time point when the so high-side transistors Q1 being turned off from the turn-on state, i.e., a time point when the duty cycle control signal Spwm is transited from the high logic level to the low logic level. The delay signal S160 represents a time point of ending a turn-off state of the low-side transistor Q2, so that a time point when the delay signal S160 is transited from the low logic level to the high logic level is the end time point of the delay signal S160.

Figure 6:
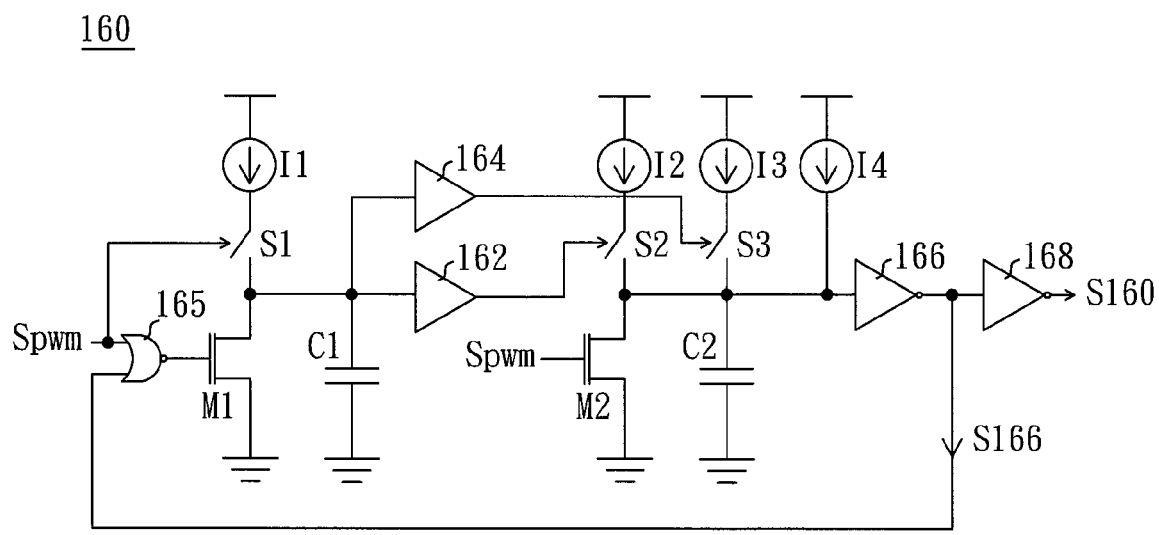
FIG. 6 is a circuit schematic diagram of a delay circuit applied in the transistor switch control circuit of FIG. 5 according to an exemplary embodiment of the invention.

Then, referring to FIG. 6, FIG. 6 is a circuit schematic diagram of a delay circuit applied in the transistor switch control circuit of FIG. 5 according to an exemplary embodiment of the invention. The delay circuit 160 includes a pulse width determination circuit and a delay decision circuit. The pulse width determination circuit includes a NOR gate 165, a transistor M1, a switch 51, a capacitor C1 and drivers 162 and 164. The delay decision circuit includes a controlled current source, a delay capacitor C2, a transistor M2 and inverters 166 and 168, where the controlled current source is consisted of current sources I2, I3 and I4 and switches S2 and S3. The delay circuit 160 adjusts a delay time between the end time point of the delay signal S160 and the end time point of the duty cycle control signal Spwm according to the duty cycle of the duty cycle control signal Spwm. The longer the duty cycle of the duty cycle control signal Spwm is, the shorter the delay time is; and the shorter the duty cycle of the duty cycle control signal Spwm is, the longer the delay time is. Based on such setting, besides that the short through problem is avoided in case of a short duty cycle of the duty cycle control signal Spwm, when the duty cycle control signal Spwm has a long duty cycle, a dead time between the high-side transistor and the low-side transistor can be decreased, so as to improve the conversion efficiency of the buck converter.

When the duty cycle control signal Spwm is at a high logic level, the transistor M2 and the switch S1 are turned on, and the transistor M1 is turned off. Meanwhile, a current source I1 charges the capacitor C1 through the switch S1. The drivers 162 and 164 are two drivers of different logic determination levels. When the capacitor C1 is charged to a first level, the driver 162 outputs the high logic level to turn on the switch S2, so that the current source I2 starts to supply a current. Then, when the capacitor C1 is charged to a second level, the driver 164 outputs the high logic level to turn on the switch S3, so that the current source I3 starts to supply a current, where the second level is higher than the first level. Accordingly, the longer the duty cycle of the duty cycle control signal Spwm is, the greater the current used for charging the capacitor C2 is. However, the transistor M2 is now in the turn-on state, so that the current sources I2-I4 cannot charge the capacitor C2, and the capacitor C2 maintains a low level, and now the inverter 166 outputs a high level output signal S166 to an input terminal of the NOR gate 165. The inverter 168 inverts the output signal S166 into the low level delay signal S160 for outputting.

When the duty cycle control signal Spwm is transited to the low logic level, the switch S1 is turned off, and meanwhile the transistor M2 is turned off, and the capacitor C2 is started to be charged. Since the output signal S166 still has the high level, the NOR gate 165 still outputs the low level signal to turn off the transistor M1. Since the switch S1 and the transistor M1 are simultaneously turned off, and the level of the capacitor C1 is fixed to maintain the outputs of the drivers 162 and 164. When the capacitor C2 is charged to a predetermined level to transit the output signal S166 of the inverter 166 to the low level, the inverter 168 outputs the high level delay signal S160. Now, the output signal S166 and the duty cycle control signal Spwm all have the low level, the NOR gate 165 outputs the high level signal to turn on the transistor M1 for discharging the capacitor C1, so that the switches S2 and S3 are all turned off to wait for operations of a next period. Now, the current source I4 continually charge the capacitor C2, so that the delay signal S160 is maintained to the high level until the duty cycle control signal Spwm is transited to the high logic level to turn the transistor M2 on and discharge the capacitor C2.

As described above, when the duty cycle control signal Spwm is transited to the low level, the capacitor C2 is started to be charged to delay a time point that the delay signal S160 is transited to the high level from the low level. The longer the duty cycle of the duty cycle control signal Spwm is, the greater the charging current of the current sources I2-I4 used for charging the capacitor C2 is, and the shorter the delay time is. Conversely, the shorter the duty cycle of the duty cycle control signal Spwm is, the smaller the charging current of the current sources I2-I4 used for charging the capacitor C2 is, and the longer the delay time is.

Figure 7:
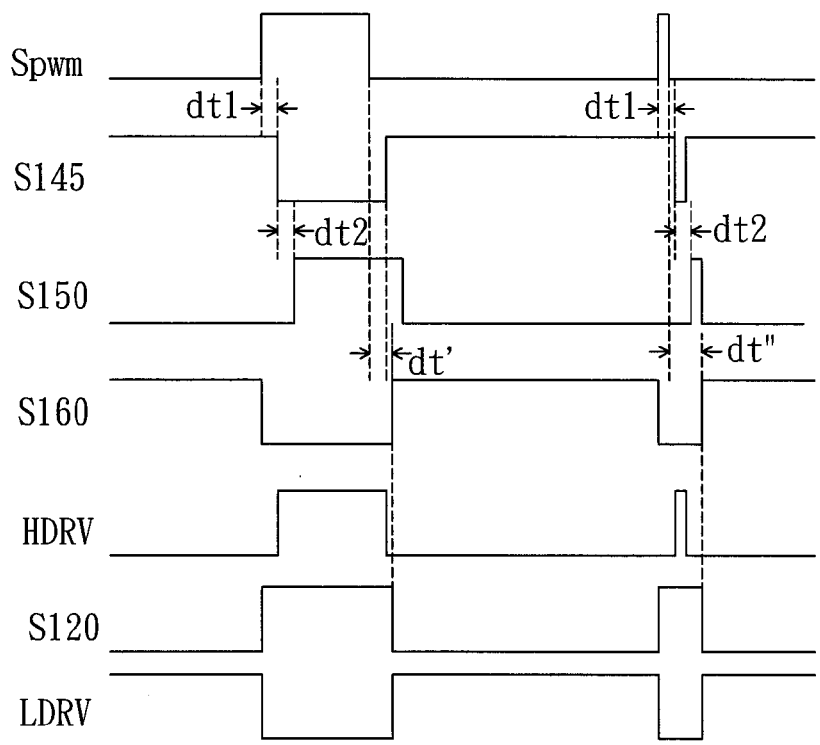
FIG. 7 is a signal waveform diagram of the transistor switch control circuit of FIG. 5.

Referring to FIG. 7, FIG. 7 is a signal waveform diagram of the transistor switch control circuit of FIG. 5. A delay time dt1 exists between the duty cycle control signal Spwm and the output signal S145 of the level shifter 145, and a delay time dt2 exists between the output signal S145 of the level shifter 145 and the output signal S150 of the level shifter 150. When the duty cycle control signal Spwm is transited to the high level from the low level, the delay signal S160 is immediately transited from the high level to the low level, and the delay signal S160 is transited to the high level for a delay time from the duty cycle control signal Spwm is transited to the low level from the high level. The low-side driving circuit 100L determines the time point that the low-side control signal LDRV is transited to the high level to turn on the low-side transistor Q2 according to the end time point of the delay signal S160 (which is the time point of transiting from the low level to the high level in the present embodiment). Moreover, comparing the left part and the right part of the signal waveform diagram of FIG. 7, the duty cycle of the duty cycle control signal Spwm at the left part of FIG. 7 is longer than the duty cycle of the duty cycle control signal Spwm at the right part of FIG. 7, so that a delay time dt' between the end time point of the delay signal S160 and the end time point of the duty cycle control signal Spwm at the left part is shorter than a delay time dt" between the end time point of the delay signal S160 and the end time point of the duty cycle control signal Spwm at the right part. A start time point of the delay signal S160 (which is a time point of transiting from the high level to the low level in the present embodiment) is the same to a start time point of the duty cycle control signal Spwm. Hence, based on the time delay function of the delay circuit 160, an activation period of the delay signal is greater than an activation period of the duty cycle control signal, i.e. a pulse width of the delay signal being at low level, is greater than a pulse width of the duty cycle control signal being at high level.

Figure 8:
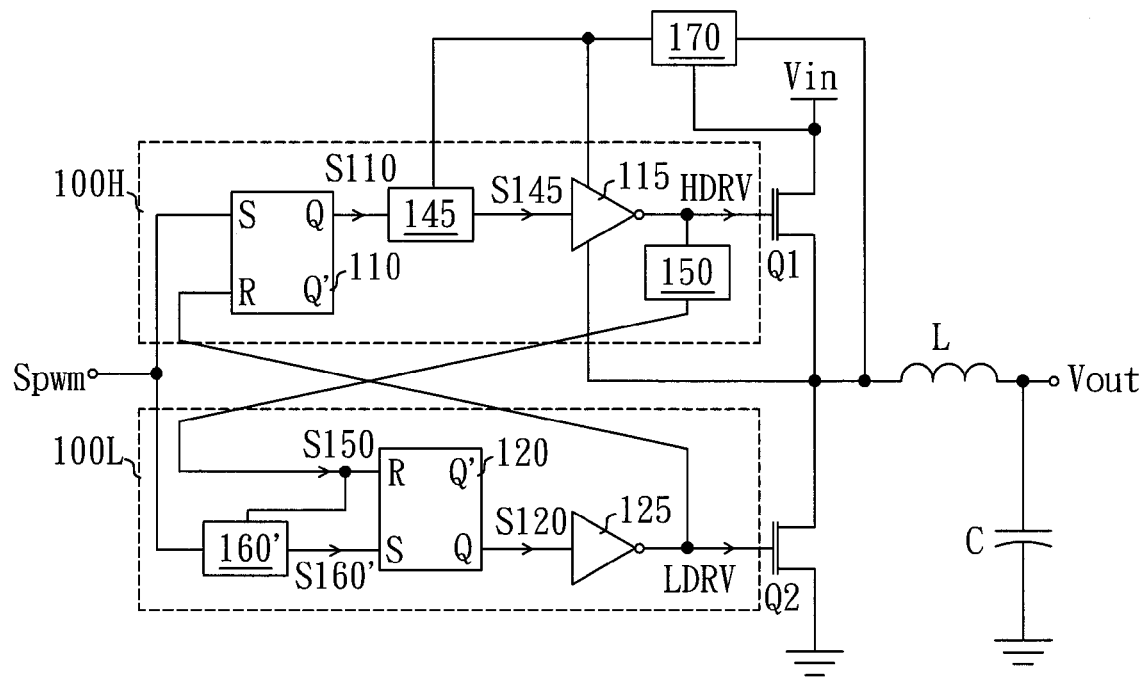
FIG. 8 is a circuit schematic diagram of a transistor switch control circuit according to a second exemplary embodiment of the invention.

Referring to FIG. 8, FIG. 8 is a circuit schematic diagram of a transistor switch control circuit according to a second exemplary embodiment of the invention. Comparing the present embodiment and the embodiment of FIG. 5, a main difference there between lies in the delay circuit. The difference of the two embodiments is described in detail below. The delay circuit 160' simultaneously receives the high-side conducting signal S150 and the duty cycle control signal Spwm to generate a delay signal S160', and the RS flip-flop 120 receives the high-side conducting signal S150 through the R terminal and receives the delay signal S160' through the S terminal to output the output signal S120. The inverter 125 inverts the output signal S120 to output the low-side control signal LDRV to control a state of the low-side transistor Q2. The delay circuit 160' determines a start time point of the delay signal S160' according to a start time point of the duty cycle control signal Spwm, and determines an end time point of the delay signal S160' according to a logic level of the duty cycle control signal Spwm after receiving the high-side conducting signal S150.

Figure 9:
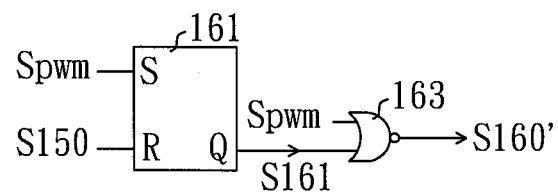
FIG. 9 is a circuit schematic diagram of a delay circuit applied in the transistor switch control circuit of FIG. 7 according to an exemplary embodiment of the invention.
Figure 10:
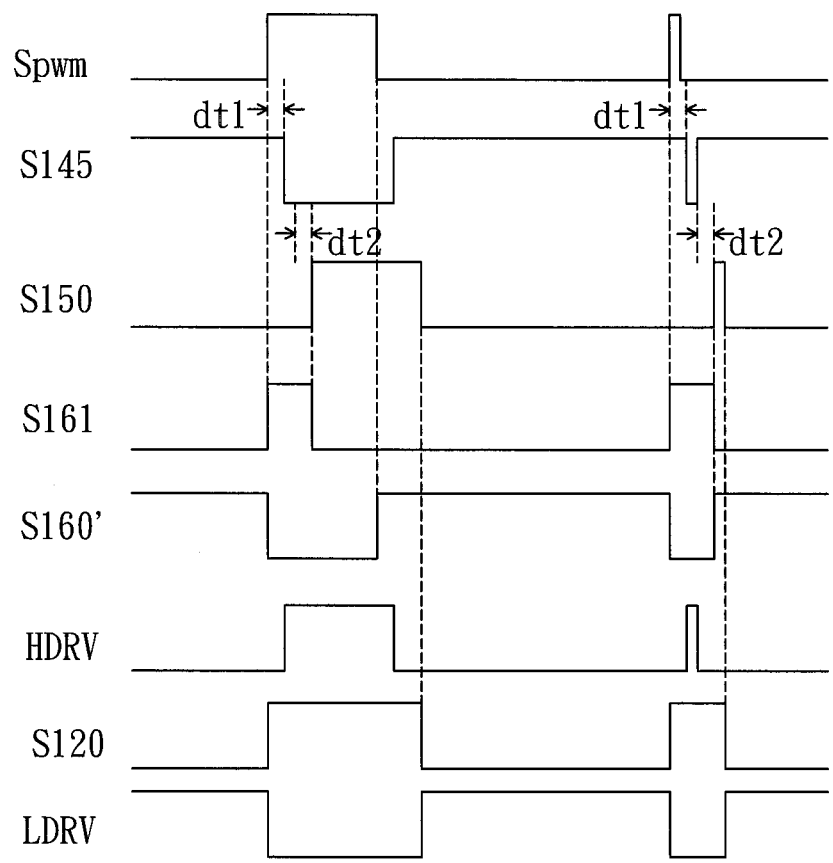
FIG. 10 is a signal waveform diagram of the transistor switch control circuit of FIG. 8 and the delay circuit of FIG. 9.

Then, referring to FIG. 9, FIG. 9 is a circuit schematic diagram of a delay circuit applied in the transistor switch control circuit of FIG. 7 according to an exemplary embodiment of the invention. FIG. 10 is a signal waveform diagram of the transistor switch control circuit of FIG. 8 and the delay circuit of FIG. 9. The delay circuit 160' includes an SR flip-flop 161 and a NOR gate 163. An S terminal of the SR flip-flop 161 receives the duty cycle control signal Spwm, and an R terminal thereof receives the high-side conducting signal S150, so as to make the SR flip-flop 161 generate an output signal S161 at the Q terminal. Therefore, the output signal S161 is transited to the high level when the duty cycle control signal Spwm is transited to the high level, and then the output signal S161 is transited to the low level until the high-side conducting signal S150 is transited to the high level. The NOR gate 163 is used for detecting whether the high-side conducting signal S150 and the duty cycle control signal Spwm are low level signals. The NOR gate 163 outputs the high level delay signal S160' when both the high-side conducting signal S150 and the duty cycle control signal Spwm are low level signals, so that the low-side driving circuit 100L outputs the low-side control signal LDRV of the high level to turn on the low-side transistor Q2. Therefore, only after the high-side conducting signal S150 is transited to the low level (the high-side control signal HDRV has been transited to the low level to turn off the high-side transistor Q1 the delay time dt1 before), the low-side transistor Q2 is turned on.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A transistor switch control circuit, for controlling a high-side transistor and a low-side transistor connected in series, and the transistor switch control circuit comprising:
   a high-side driving circuit, generating a high-side control signal according to a duty cycle control signal to turn on the high-side transistor and generate a high-side conducting signal; and
   a low-side driving circuit, generating a low-side control signal according to the duty cycle control signal and the high-side conducting signal to turn on the low-side transistor, and the low-side driving circuit comprising:
      a delay circuit, generating a delay signal according to the duty cycle control signal, wherein a pulse width of the delay signal is greater than a pulse width of the duty cycle control signal for more than a predetermined time period; and
      a short through preventing circuit, generating the low-side control signal according to the delay signal and the high-side conducting signal, so that the low-side transistor is turned on after the high-side transistor is turned off, and is turned off before the high-side transistor is turned on.

2. The transistor switch control circuit as claimed in claim 1, wherein the delay circuit adjusts a pulse width difference between the pulse width of the delay signal and the pulse width of the duty cycle control signal according to the pulse width of the duty cycle control signal, so that the wider the pulse width of the duty cycle control signal is, the smaller the pulse width difference is.

3. The transistor switch control circuit as claimed in claim 2, wherein the delay circuit comprises a controlled current source and a delay capacitor, the controlled current source provides a current to adjust a potential of the delay capacitor according to the pulse width of the duty cycle control signal, and the delay circuit adjusts the pulse width of the delay signal according to the potential of the delay capacitor.

4. The transistor switch control circuit as claimed in claim 3, wherein the delay circuit further comprises a pulse width determination circuit comprising a current source and a pulse width determination capacitor, wherein the current source charges the pulse width determination capacitor according to the duty cycle control signal.

5. The transistor switch control circuit as claimed in claim 1, wherein the delay circuit comprises a controlled current source and a delay capacitor, the controlled current source provides a current to adjust a potential of the delay capacitor according to the pulse width of the duty cycle control signal, and the delay circuit adjusts the pulse width of the delay signal according to the potential of the delay capacitor.

6. The transistor switch control circuit as claimed in claim 5, wherein the delay circuit further comprises a pulse width determination circuit comprising a current source and a pulse width determination capacitor, wherein the current source charges the pulse width determination capacitor according to the duty cycle control signal.

7. A transistor switch control circuit, for controlling a high-side transistor and a low-side transistor connected in series, and the transistor switch control circuit comprising:
  a high-side driving circuit, generating a high-side control signal according to a duty cycle control signal to turn on the high-side transistor and generate a high-side conducting signal; and
  a low-side driving circuit, generating a low-side control signal according to the duty cycle control signal and the high-side conducting signal to turn on the low-side transistor, and the low-side driving circuit comprising:
    a delay circuit, generating a delay signal, wherein a start time point of the delay signal is determined according to a start time point of the duty cycle control signal, and an end time point of the delay signal is determined according to a logic level of the duty cycle control signal after receiving the high-side conducting signal; and
    a short through preventing circuit, generating the low-side control signal according to the delay signal and the high-side conducting signal, so that the low-side transistor is turned on after the high-side transistor is turned off, and is turned off before the high-side transistor is turned on.

8. The transistor switch control circuit as claimed in claim 7, wherein the start time point of the delay signal is a time point when the delay signal is transited from a high level to a low level, and the end time point of the delay signal is a time point when the delay signal is transited from the low level to the high level.

9. The transistor switch control circuit as claimed in claim 7, wherein the delay circuit starts to determine a logic level of the duty cycle control signal after detecting a rising edge of the high-side conducting signal, and adjusts a logic level of the delay signal according to the logic level of the duty cycle control signal.

10. The transistor switch control circuit as claimed in claim 9, wherein the delay circuit stops changing the logic level of the delay signal after detecting a rising edge of the duty cycle control signal.

11. The transistor switch control circuit as claimed in claim 8, wherein the delay circuit starts to determine a logic level of the duty cycle control signal after detecting a rising edge of the high-side conducting signal, and adjusts a logic level of the delay signal according to the logic level of the duty cycle control signal.

12. The transistor switch control circuit as claimed in claim 11, wherein the delay circuit stops changing the logic level of the delay signal after detecting a rising edge of the duty cycle control signal.

* * * * *